United States Patent
Eichstaedt et al.

(10) Patent No.: US 6,510,431 B1
(45) Date of Patent: Jan. 21, 2003

(54) METHOD AND SYSTEM FOR THE ROUTING OF REQUESTS USING AN AUTOMATED CLASSIFICATION AND PROFILE MATCHING IN A NETWORKED ENVIRONMENT

(75) Inventors: Matthias Eichstaedt, San Jose, CA (US); Jeffrey Thomas Kreulen, San Jose, CA (US); Vikas Krishna, San Jose, CA (US); William Scott Spangler, San Martin, CA (US); Hovey Raymond Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/340,380

(22) Filed: Jun. 28, 1999

(51) Int. Cl.[7] .......................... G06F 17/30; G06F 15/173
(52) U.S. Cl. .................................... 707/10; 709/224
(58) Field of Search ..................... 707/4, 10, 104–106, 707/1, 3, 104.1; 709/224, 201; 705/1, 200, 400; 345/810; 704/9, 235, 260, 270; 717/345; 700/4, 83

(56) References Cited

U.S. PATENT DOCUMENTS

| | | | |
|---|---|---|---|
| 4,994,966 A | 2/1991 | Hutchins ........................ | 704/9 |
| 5,371,807 A | 12/1994 | Register et al. .............. | 382/159 |
| 5,386,556 A | 1/1995 | Hedin et al. ................... | 707/4 |
| 5,446,891 A | 8/1995 | Kaplan et al. ................. | 707/2 |
| 5,528,491 A | 6/1996 | Kuno et al. ..................... | 704/9 |
| 5,835,087 A | * 11/1998 | Herz et al. ................... | 345/810 |
| 5,999,908 A | * 12/1999 | Abelow .......................... | 705/1 |
| 6,112,181 A | * 8/2000 | Shear et al. .................... | 705/1 |
| 6,122,617 A | * 9/2000 | Tjaden ......................... | 704/260 |
| 6,195,697 B1 | * 2/2001 | Bowman-Amuah ......... | 709/224 |

FOREIGN PATENT DOCUMENTS

| | | |
|---|---|---|
| EP | 597630 A1 | 5/1994 |
| EP | 836144 A2 | 4/1998 |
| WO | WO9837474 | 8/1998 |

OTHER PUBLICATIONS

"Parsing or Tokenizing Tables Using Finite State Machines to Direct Program Actions as well as Program Control Flow," *IBM Technical Disclosure Bulletin*, vol. 31, No. 8, Jan. 1989, 231–235.

* cited by examiner

Primary Examiner—Safet Metjahic
Assistant Examiner—Susan Chen
(74) Attorney, Agent, or Firm—Sawyer Law Group LLP

(57) ABSTRACT

A system and method for routing customer requests to advisors is disclosed. The system and method comprises at least one customer server process for receiving customer requests and classifying the information to produce a classified request, the classified request comprising the original request and at least one attribute. The system further comprises at least one advisor server process for receiving the classified requests, comparing the classified requests by associated profiles from the advisors to find matching attributes with classified request, and creating a connection between the requesting customer and at least one advisor, the at least one advisor having submitted a profile with matching attributes. A routing system in accordance with the present invention reduces response time to a problem and saves advisor time. The system also provides for an automatic response to frequent problems at increased efficiency. Finally, a system and method in accordance with the present invention is widely applicable to online shopping and customer service.

21 Claims, 9 Drawing Sheets

METHOD AND SYSTEM FOR THE ROUTING OF REQUESTS USING AN AUTOMATED CLASSIFICATION AND PROFILE MATCHING IN A NETWORKED ENVIRONMENT

FIELD OF THE INVENTION

The present invention relates generally to systems for routing requests and more particularly to a system for routing requests using automated classification and profile matching in a networked environment.

BACKGROUND OF THE INVENTION

There are many environments where there are so-called help desks for allowing a seller of goods or services to provide expert help to customers. Oftentimes customer support for such a system, such as a call center or help center for e-mail routing, voice calling, or the like is manual. Typically such customer support requires a large number of experts that can interact with the customers on a variety of problems. As a result, the experts must be versed over a broad spectrum of information related to the particular problem.

In the alternative, the experts are narrowly focused on specific items of interest; however, this requires that the customer either be experienced enough to identify the particular menu item that is most applicable or search through all of the menu items to obtain information. This is oftentimes time consuming and therefore discouraging to the customer. It is desirable to be able to shift customers to self-service solutions in which they can sift through some simple questions to get to the most relevant information quickly, rather than being required to go through several different menu items to finally get to the particular item of interest. Particularly as the Internet has grown, customers have desired extensive web-enabled services for products and services, and are becoming increasingly familiar therewith.

Accordingly, what is desired in making inquiries through such customer support is an increase in efficiency and reduced cost. It also is desirable to be able to provide instant help for recurrent problems that a user may have. Finally, what is also desired is to be able to provide a direct connection to a competent advisor, thereby allowing instant access to the relevant information. Finally, any solution should be a low cost, high benefit solution that can be used via the Internet. Accordingly, the present invention addresses such a need.

SUMMARY OF THE INVENTION

A system and method for routing customer requests to advisors is disclosed. The system and method comprises at least one customer server process for receiving customer requests and classifying the information to produce a classified request, the classified request comprising the original request and at least one attribute. The system further comprises at least one advisor server process for receiving the classified requests, comparing the classified requests by associated profiles from the advisors to find matching attributes with classified request, and creating a connection between the requesting customer and at least one advisor, the at least one advisor having submitted a profile with matching attributes.

A routing system in accordance with the present invention reduces response time to a problem and saves advisor time. The system also provides for an automatic response to frequent problems at increased efficiency. Finally, a system and method in accordance with the present invention is widely applicable to online shopping and customer service.

DETAILED DESCRIPTION OF THE INVENTION

The present invention relates generally to systems for routing inquiries and more particularly to a system for routing inquiries based on web-based environments. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
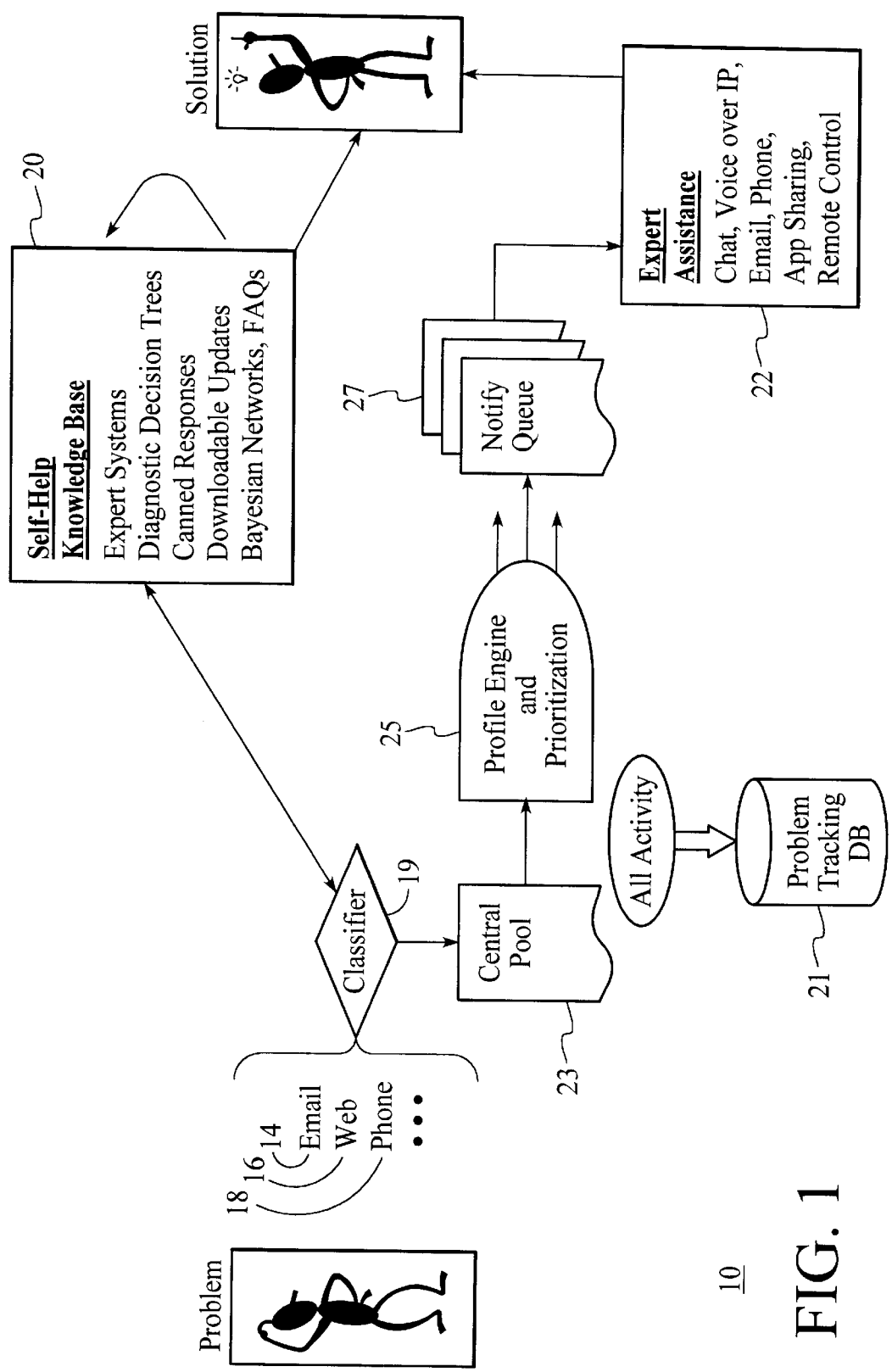
FIG. 1 illustrates a system architecture which would implement the present invention.

FIG. 1 illustrates a system architecture which would implement the present invention. The system architecture 10 includes a plurality of modes of operation to input problems by a user 12. The modes include a mode 14 for email messages, a mode 16 for messages web-based server, and a mode 18 for voice response units (VRU). Through each of these modes 14–18 a user can provide the problem to an automatic classifier 19. Automatic classifier 19 provides information about all the problems to problem tracking database 21 and a self help knowledge base 20. The self help knowledge base 20 includes but is not limited to expert systems, diagnostic decision trees, canned responses and downloadable updates. Classifier 19 also provides data information to a central pool 23. The central pool 23 provides information to a profile engine and prioritization system 25. This information is then sent to a notify queue 27 which performs a matching and routing function. The notify queue 27 in turn provides routing information to the expert assistance system 22. The expert assistance system 22 includes but is not limited to chat, voice, email, phone, application sharing, and remote controls. The present invention facilitates more efficient use of such a system while minimizing the knowledge required by the customer or user.

Figure 2:
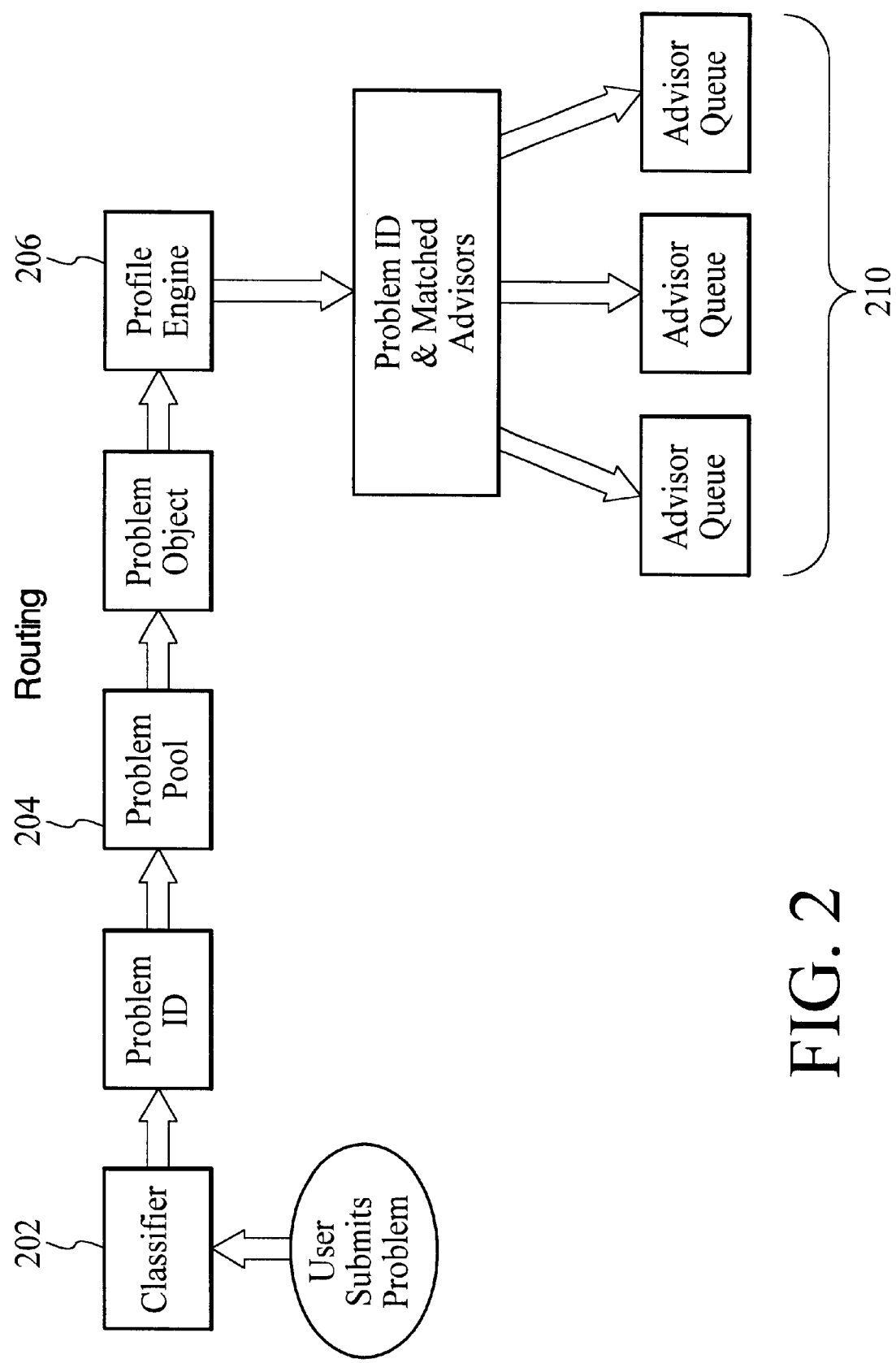
FIG. 2 illustrates a system flow in accordance with the present invention.

FIG. 2 illustrates a system flow in accordance with the present invention. The present invention is a system and method for allowing the connection of a customer to a plurality of advisors, a customer being a potential consumer of goods, information or services and an advisor being a supplier of goods, information or services, each of the advisors submits a profile document containing a set of one or more attributes. The system includes an automatic classifier 202 which takes information for the customer and provides the information to a problem pool 204 of submissions. Those submissions are then provided to profile engines 206. The information provided to the advisor queues 210 for advisors with profiles that match attribute of the information according to a prespecified matching scheme.

The present invention provides for the above-mentioned classifier functionality by generatively a keyword dictionary in a dataset of text transcripts; constructing a set of categories, where each category contains examples with similar keywords; and building a classifier that finds the most similar category of a new text instance based on similarity of keyword occurrence.

Thereafter the router is used to match requests against multiple profiles, for example (based on a human generated mapping from input categories to skills categories) in multiple profile engines for scalability. Thereafter, the problem is connected with the first advisor corresponding to a matched profile. The first advisor responds actively after a pointer to the input is placed in a queue of the advisor. In addition, as will be explained in detail later, there is a mechanism for providing the problem to a wider set of queues (i.e., hierarchy of advisors) if no advisor with a matched profile responds within a predetermined time period.

To more particularly describe the features of the present invention, refer now to the following discussion in conjunction with the accompanying figures.

Figure 3:
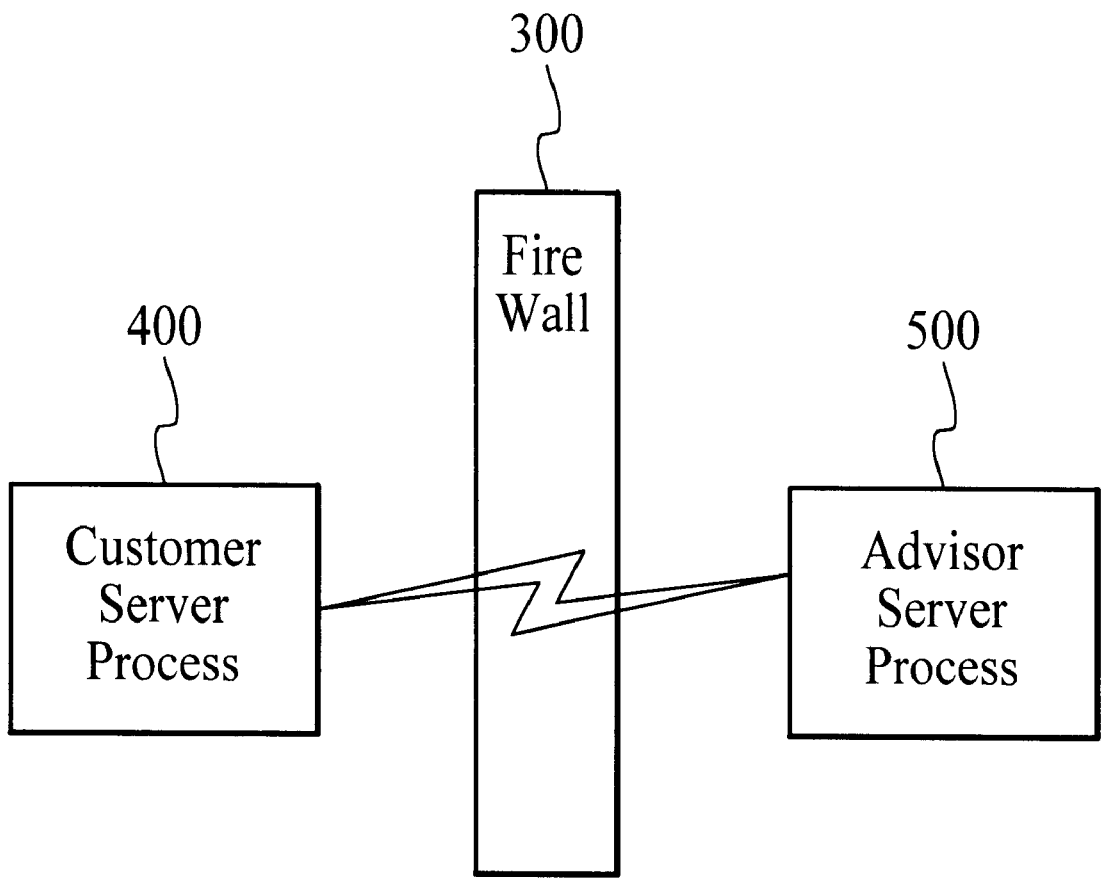
FIG. 3 is a simple block diagram of a customer server in communication with an advisor server in accordance with the present invention.
Figure 4:
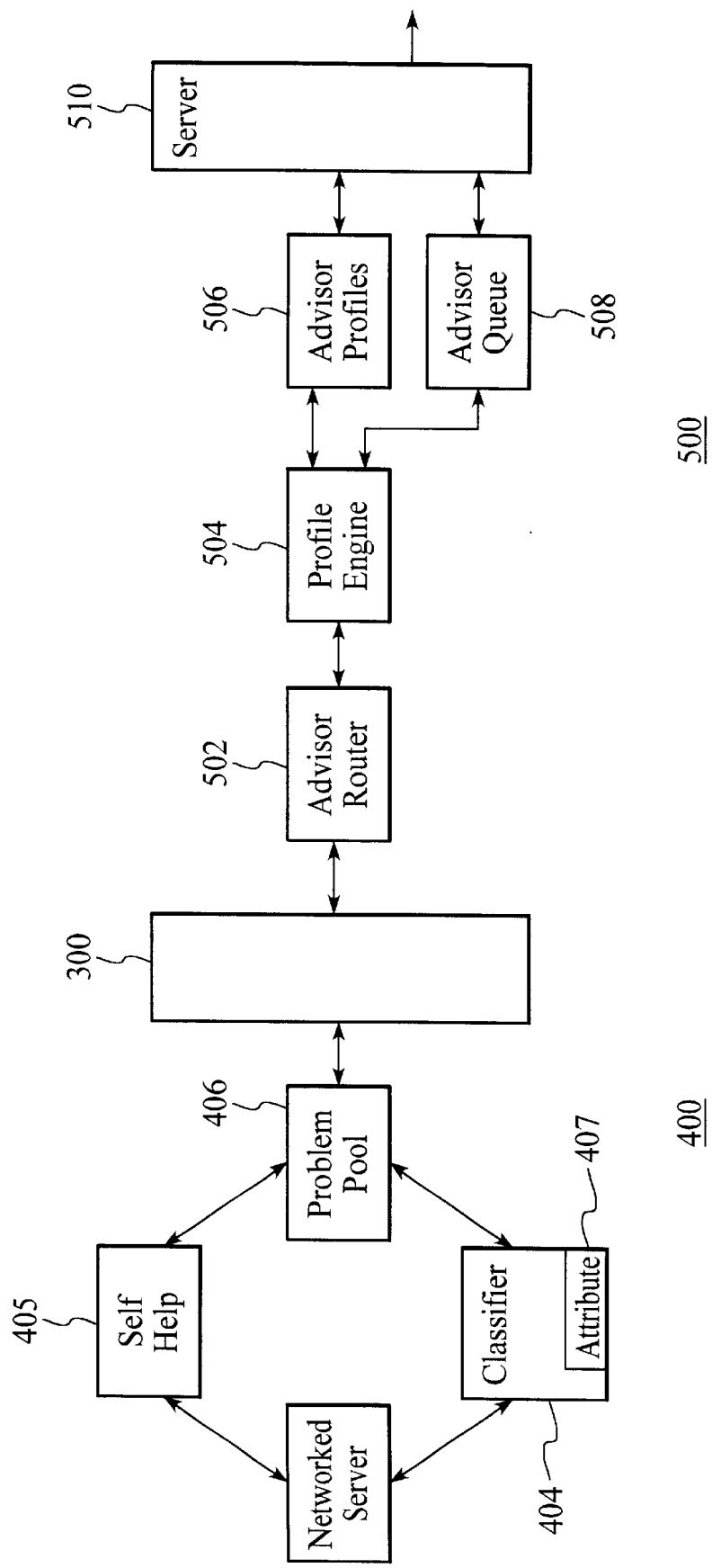
FIG. 4 is a more detailed block diagram of FIG. 3.

FIG. 3 is a simple block diagram of a customer server process 400 in communication with an advisor server 500 in accordance with the present invention. FIG. 4 is a more detailed block diagram of FIG. 3. The FIGS. 3 and 4 illustrate the communication between the advisor server process 500 and customer server process 400.

The customer server process 400 and the advisor server process 500 cooperate to communicate a problem from a customer to an appropriate advisor in an efficient manner. To explain this cooperation in more detail, refer now to the following discussion.

The customer server process 400 receives customer requests and classifies information to produce a classified request. The classified request comprises the request from the customer and at least one attribute. Example attributes are, for example, available. To more particularly describe the operation of the customer server process 400 and the advisor server process 500 refer now to the following discussion and the accompanying figures.

Figure 5:
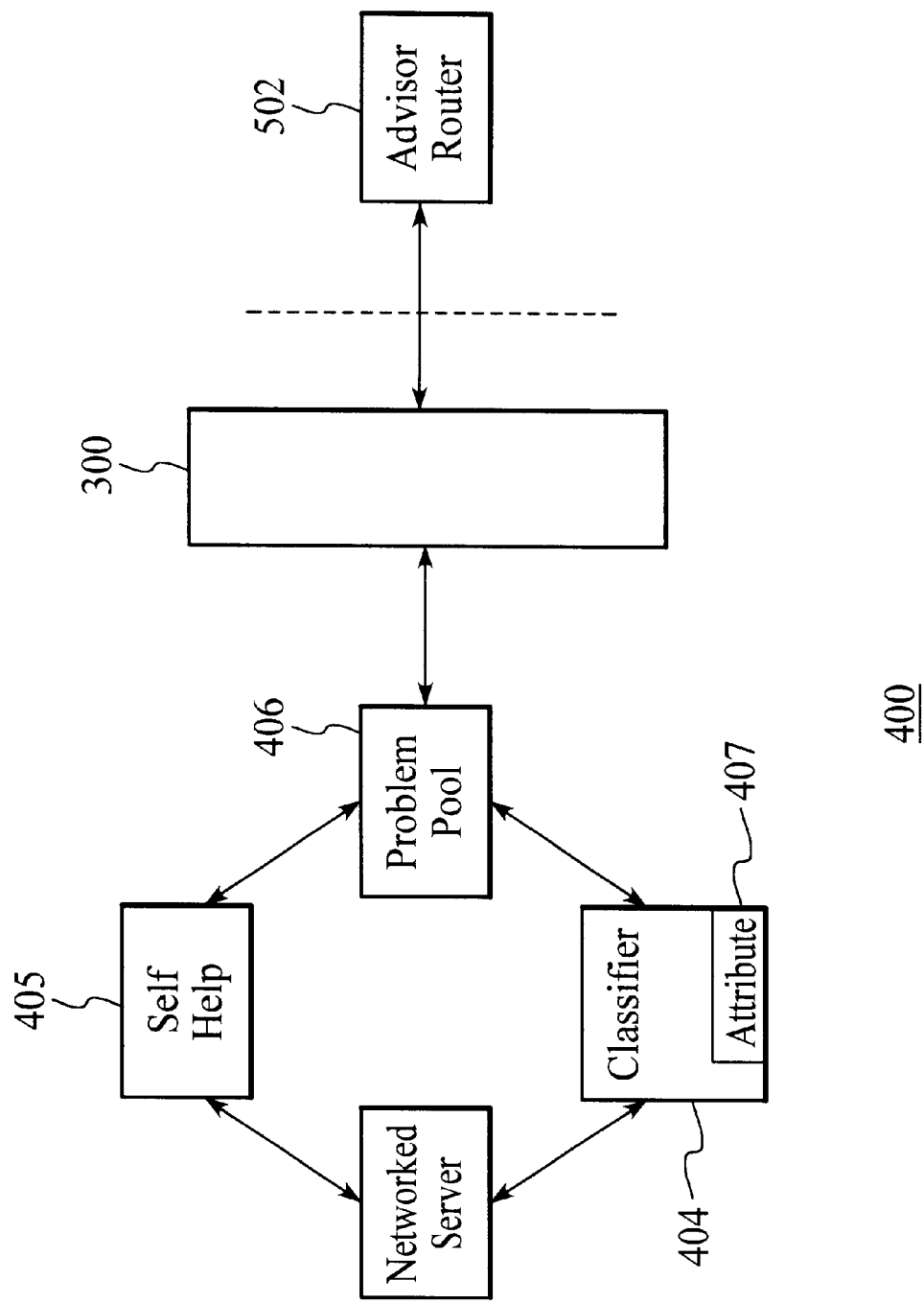
FIG. 5 is a block diagram of a customer server.

FIG. 5 is a block diagram of a customer server process 400. As is seen, the customer server includes a networked server 402 which through classifier 404 and self help mechanism 405 provides classified requests to a problem pool 406. The classifier 404 includes a plurality of attributes 407 that are associated with the request from the customer to insure that the request is sent to an advisor that can accurately and quickly help the customer. The classified requests therefore include the request from the user along with the attributes. It should be understood by one of ordinary skill in the art that there could be any number of attributes associated with request and that number would be within the spirit and scope of the present invention. The problem pool 406 then stores classified requests and sends the requests through the firewall 300 via a router 502.

Figure 6:
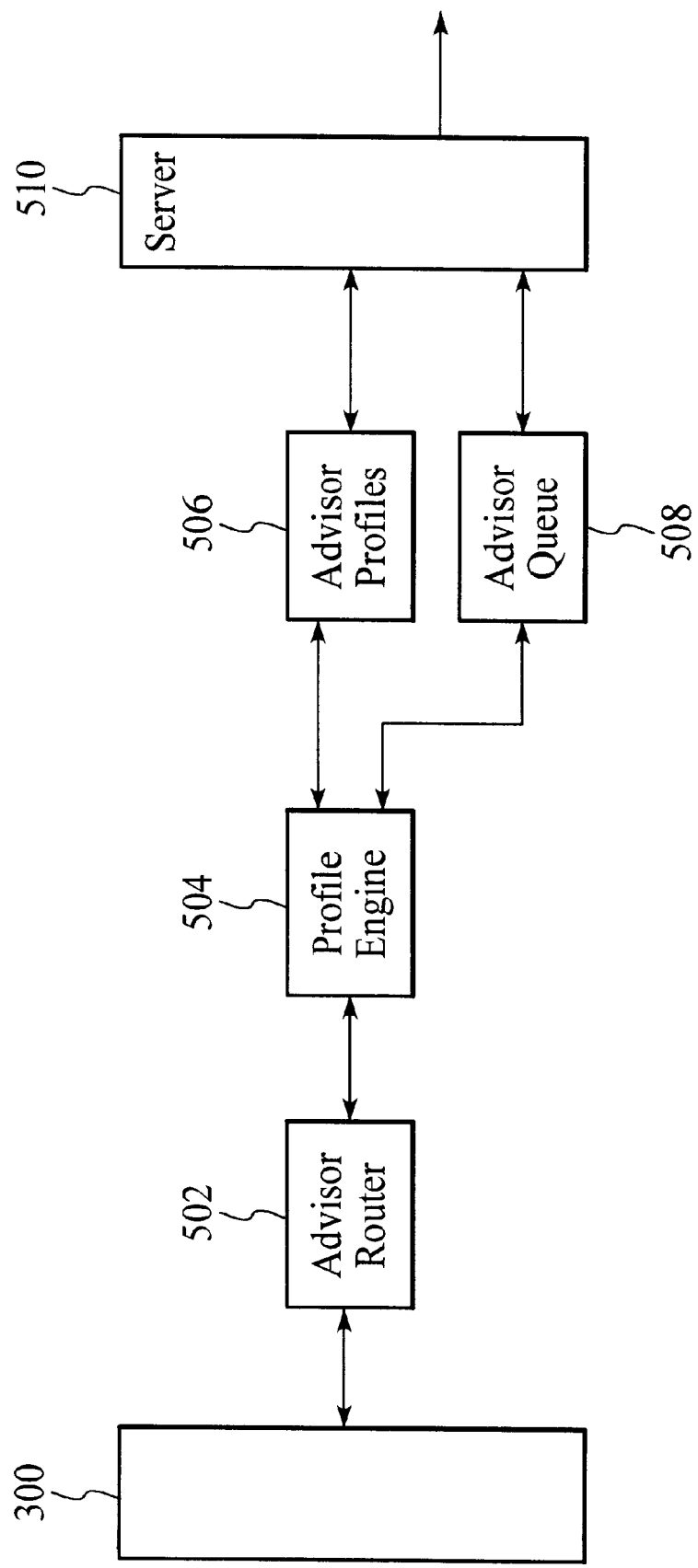
FIG. 6 is a block diagram of an advisor server.

FIG. 6 is a block diagram of an advisor server process 500. The advisor server process receives the classified requests, via advisor router 502. The classified requests are compared to the advisor profiles 506 in the profile engine 504. The profile engine 504 compares the classified requests to associated profiles to find matching attributes with the classified requests. The advisor process server 510 then creates a connection between the requesting customer and an advisor, the one advisor having submitted a profile with matching attributes.

Figure 7:
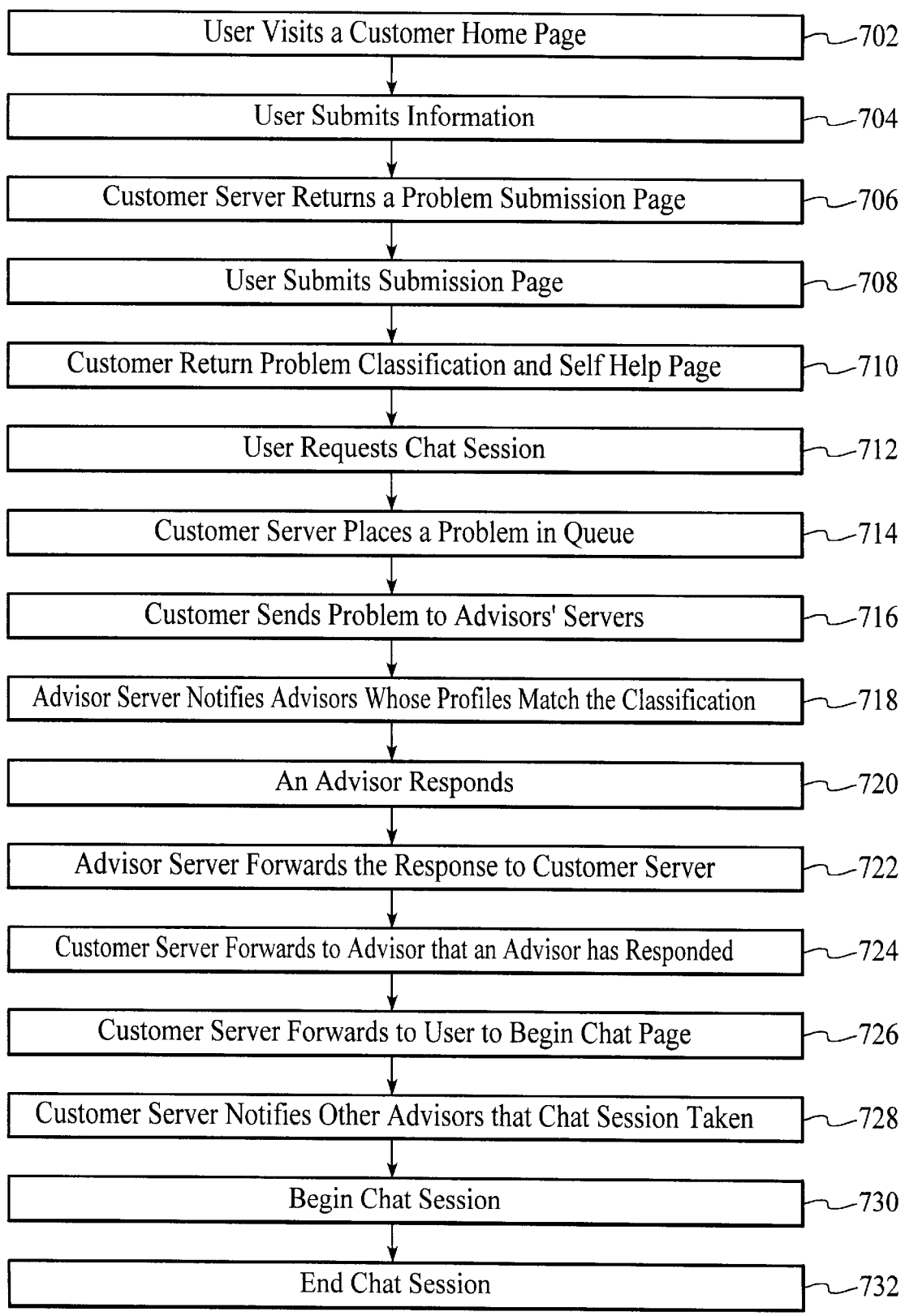
FIG. 7 is a flow chart of an example of routing an inquiry on a web based system in accordance with the present invention.

FIG. 7 is a flow chart of an example of routing an inquiry on a web based system in accordance with the present invention. First, the user visits a customer server home page, via step 702. On the customer service home page, for example, there would be a form which identifies the user as well as registering any new users. There may be also included a help button and a submit button in a preferred embodiment.

Next, the user submits the identifying information, via step 704. Thereafter, a customer server returns a problem submission page, via step 706. The problem submission page in a preferred embodiment would display the current status of the customer network and systems and a personalized welcome. The form would include a text input for problem description and once again a submit button and a help button.

Thereafter, the user enters the appropriate information onto the submission page, via step 708. The customer server then returns problem classification and self help page, via step 710.

Thereafter, the user requests, for example, a chat session, via step 712. The customer server then places the problem in a queue awaiting a chat, via step 714, and sends the problem ID and classification to advisor servers, via step 716. The advisor server notifies the advisors whose profiles match the classification by showing advisors the chat session requested page, via step 718.

An advisor responds to begin a chat session, via step 720.

The advisor via the advisor server then forwards the request from the chat session to customer server, via step 722. The customer server then forwards to the advisor server that an advisor has begun a chat page, via step 724. The customer server also forwards to the customer to begin chat page, via step 726.

The customer server also notifies other advisors that the chat session is already taken, via step 728. Thereafter a three-way chat session begins with the customer server recording chat between customer and advisor, via step 730. Finally, the chat session ends and the customer server logs the entire interaction via step 732.

An important feature of the present invention is that the problem can be escalated to more advisors when an initial set of advisors do not respond within a predetermined time period. That is, if there are a plurality of advisors, that have a hierarchy, then a system can be provided that allows a problem to be first delivered to any of the advisors with profiles which most closely match the attributes of the user problem. Thereafter, if those advisors do not respond to the problem within a predetermined time period, then a next level of advisors are contacted. If, after some predetermined time period those advisors do not respond, finally the problem is broadcast to all the advisors. To more particularly describe this feature, refer to FIGS. 8 and 9 and the accompanying description.

Figure 8:
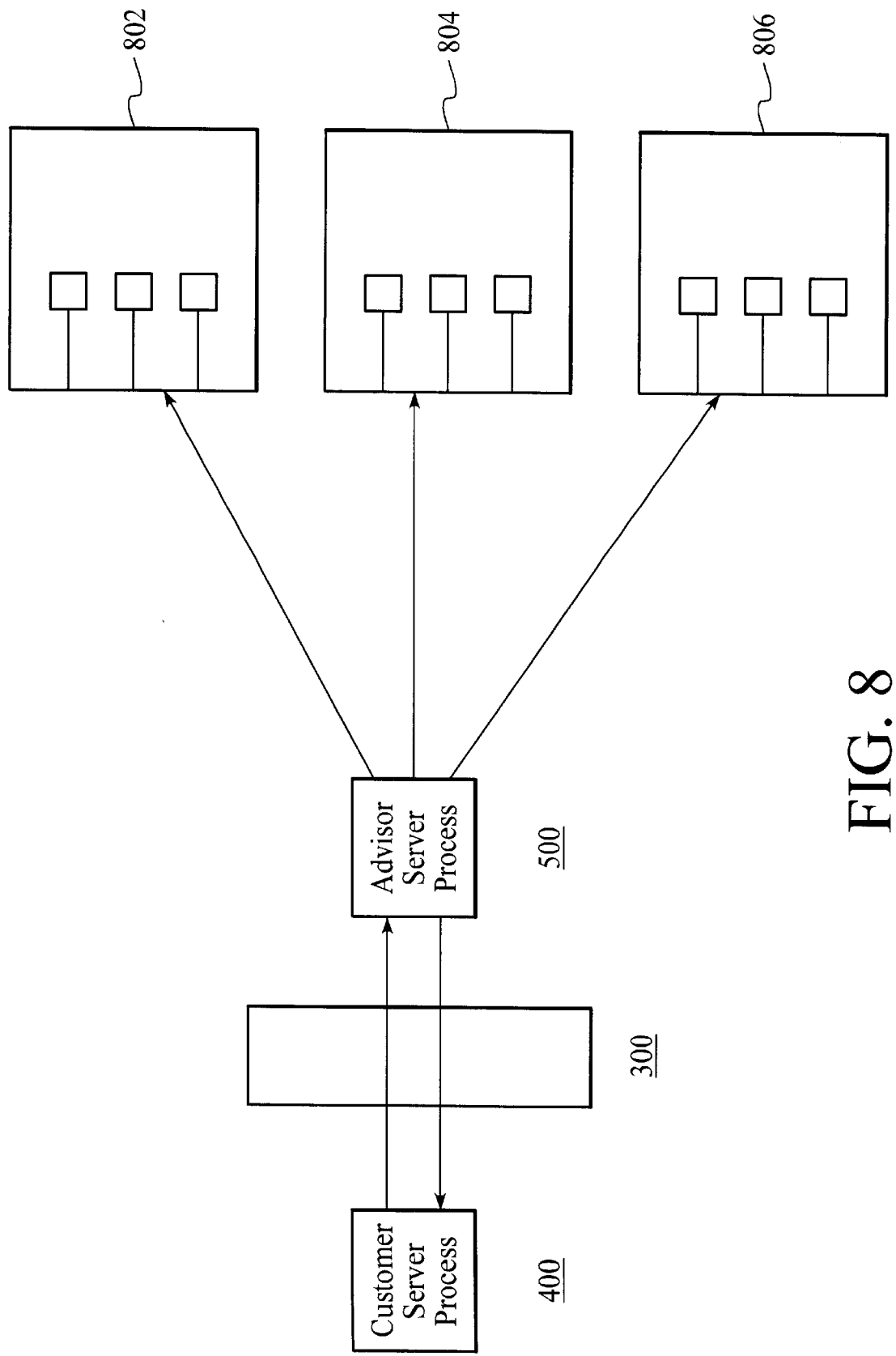
FIG. 8 illustrates a system which includes the customer server, advisor server and the associated advisors submitting a problem to the customer server.
Figure 9:
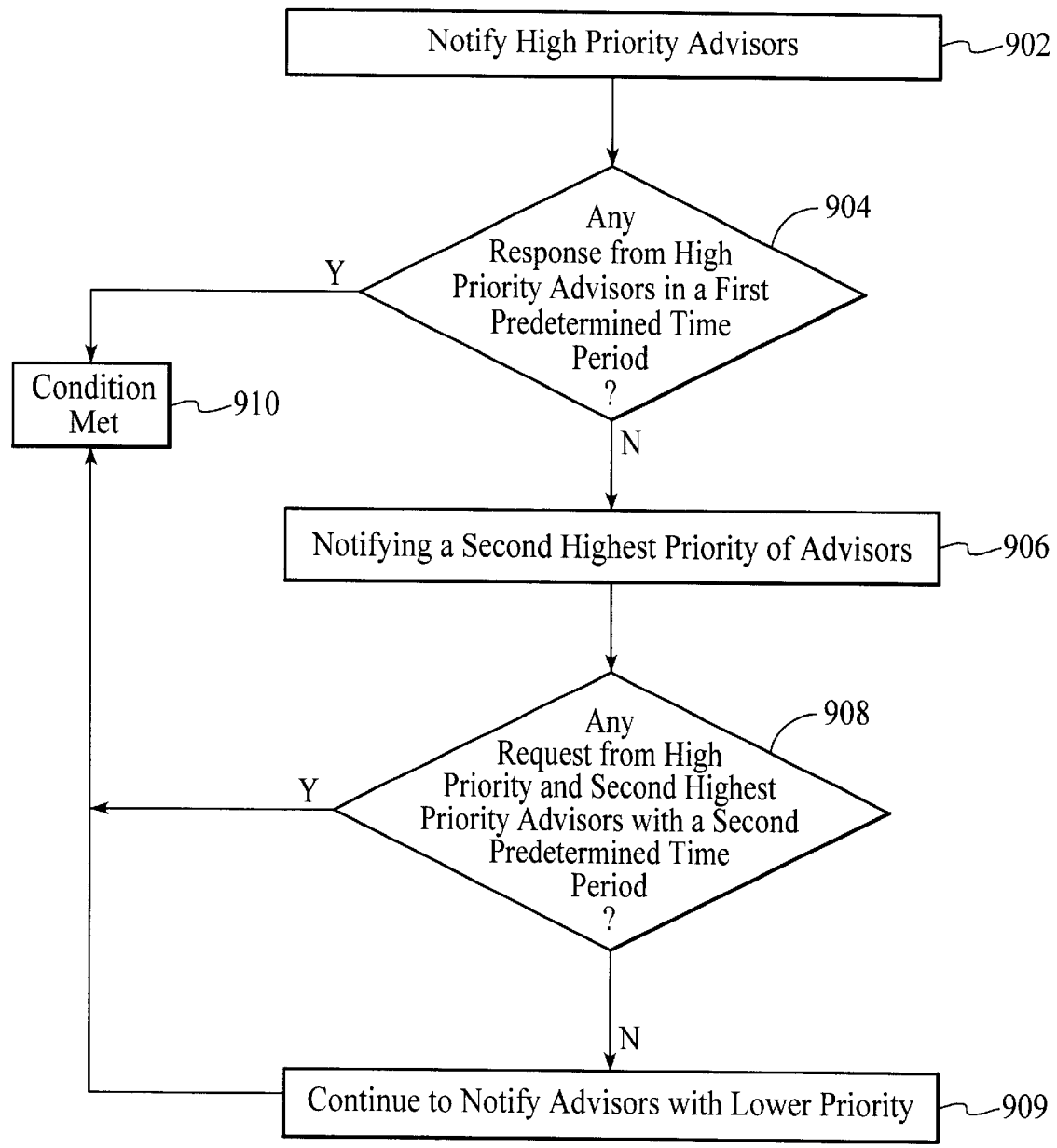
FIG. 9 is a flow chart illustrating the escalation to a wider set of advisors queues in accordance with the present invention.

FIG. 8 illustrates a system 800 which includes the customer server, advisor server and the associated advisors submitting a problem to the customer server. As is seen, the advisor server process can serve a plurality of sets of advisors 802, 804 and 806. A first set of advisors 802 may have a profile which closely matches the problem being submitted by a user and may therefore be classified as expert or high priority advisors. The set of advisors 804 may have a profile which matches the problem submitted by the user less closely than advisors 802 and may therefore be classified as knowledgeable or medium priority advisors. Finally, the set of advisors 806 may have a profile which matches the problem submitted by the user less closely than advisors 802 and 804 and may therefore be classified as not proficient or low priority advisors. Accordingly, each of the advisors 802, 804 and 806 has a profile document that associates with each attribute of a customer request one of a plurality of priorities ranging in succession from high priority to low priority. To explain this feature further in more detail refer to FIG. 9.

First, the advisor server process notifies a first plurality of advisors whose profile documents indicate a high priority for the attributes of the classified request, via step 902. If none of the first plurality of advisors responds after a first predetermined time period, via step 904, the advisor server process resends the requests to additionally notify a second plurality of advisors whose profile documents indicate one of the two highest priorities on the attributes of the classified request, via step 906. Thereafter, if none of the second plurality of advisors responds after a second predetermined time period, via step 908, the advisor server process continues to notify more advisors with lower priority on the attributes of the classified requests based on predetermined time periods until either an advisor responds or a predetermined timeout occurs, via steps 909 and 910.

A routing system in accordance with the present invention reduces response time to a problem and saves advisor time. The system also provides for an automatic response to frequent problems at increased efficiency. Finally, a system and method in accordance with the present invention is widely applicable to online shopping and customer service.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for routing customer requests to advisors comprising:

at least one customer server process for receiving customer requests and for classifying the information to produce a classified request, the classified request comprising the original request and at least one attribute, wherein the at least one customer server process comprises:
a networked server process for receiving customer requests;
a classifier for receiving the customer requests from the networked server process and associating the request with a set of attributes; and
a problem pool for string the classified requests; and at least one advisor server process for receiving the classified requests from the problem pool, for comparing the classified requests with associated profiles from the advisors to find matching attributes with the classified request, and for creating a connection between the requesting customer and the at least one advisor, the at least one advisor having submitted a profile with matching attributes, wherein each of the advisors has a profile document that associates with each attribute of a customer request one of a plurality of priorities ranging in succession from high priority to low priority, and wherein the customer server process notifies a first plurality of advisors whose profile documents indicate a high priority on at least one of the attributes of the classified request and if none of the first plurality of advisors responds after a first predetermined time period, the customer server process notifies a second plurality of advisors whose profile documents indicate one of the two highest priorities on at least one of the attributes of the classified request, and if none of the second plurality of advisors responds after a predetermined time period, the customer server process continues to notify more advisors with lower priority on the attributes of the classified requests based on predetermined time periods until a predetermined condition is met.

2. The system of claim 1 wherein the separation of the customer server process and the advisor server process provide for independent multiple instantiations in order to serve arbitrarily large pluralities of customers and advisors.

3. The system of claim 2 wherein a customer being a potential consumer of goods, information or services.

4. The system of claim 3 wherein an advisor is a supplier of goods, information or services.

5. The system of claim 4 wherein an advisor submits a profile document containing at least one attribute to the advisor server process.

6. The system of claim 1 which includes a communications mechanism for arbitrarily interconnecting and routing classified requests between each customer server process and each advisor server process.

7. The system of claim 1 wherein the at least one advisor server process comprises:

an advisor server for receiving classified requests from a customer server process;

a storage for receiving and storing advisor profile documents;

a comparator for matching classified requests with attributes in advisor profile documents;

a notification means for noticing advisors when a matching request has been received; and a mechanism to establish and maintain connections between the at least one advisor server process and at least one customer server process.

8. The system of claim 1 wherein the at least one customer server comprises a plurality of customer server processes.

9. The system of claim 1 wherein the at least one advisor server comprises a plurality of advisor server processes.

10. The system of claim 1 wherein a customer can create a connection with an advisor, a connection being realized on any form of synchronous or asynchronous communication mechanism including web, email, or phone.

11. The system of claim 1 which includes means for resending the classified requests that have stayed in the problem pool longer than a prespecified time.

12. The system of claim 1 which includes means for establishing a match between an attribute in a classified request and an attribute in an advisor profile document depending on the priority indicated by the profile document and on the time the classified request has resided in the problem pool in order to increase the size of the plurality of advisors notified about the classified request after each of a succession of prespecified time durations.

13. A method for routing customer requests to advisors comprising the steps of:
  (a) receiving customer requests;
  (b) classifying the information to produce a classified request, the classified request comprising the original request and at least one attribute, wherein the classifying step (b) further comprises the steps of,
    (b1) storing a primary copy of the classified requests in a problem pool; and
    (b2) sending the classified requests to at least one process;
  (c) receiving the classified request;
  (d) comparing the classified request by associated profiles from the advisors to find matching attributes with the classified request; and
  (e) creating a connection between the requesting customer and at least one advisor, the at least one advisor having submitted a profile with matching attributes;
  (f) not g a first plurality of advisors whose profile documents indicate a high priority on at least one of the attributes of the classified request, and if none of the first plurality of advisors responds after a first predetermined time period;
  (g) notifying a second plurality of advisors whose profile documents indicate one of the two highest priorities on at least one of the attributes of the classified request, and if none of the second plurality of advisors responds after a second predetermined time period; and
  (h) notifying more advisors with lower priority on the attributes of the classified requests based upon the time periods until a predetermined condition is met.

14. The method of claim 13 wherein a customer is a potential consumer of goods, information or services.

15. The method of claim 14 wherein an advisor is a supplier of goods, information or services.

16. The method of claim 15 wherein an advisor submits to a profile document containing at least one attribute to an advisor server process.

17. The method of claim 13 which includes the step of interconnecting and routing classified requests between customers and advisors.

18. The method of claim 13 which further includes the step (f) of creating a connection by a customer with an advisor, a connection being realized on any form of synchronous or a synchronous communication mechanism including web, email, or phone.

19. The method of claim 13 in which comparing step (d) filer comprises the steps of:
  (d1) searching advisor profile documents for attributes matching the attributes of the classified requests;
  (d2) noting a plurality of advisors whose profile documents contain matching attributes of the existence of classified requests; and
  (d3) responding to each request from an advisor to be connected to a customer who has submitted a request, the response being determined by the order the advisor requests for connection to the customer arrive at the problem pool where the primary copy of the customer is stored.

20. The method of claim 13 in which the step (e) further comprises the steps of:
  (e1) setting up one or more connections based on responses to advisor requests from The problem pool; and
  (e2) removing classified requests for which connections have been made from the problem pool.

21. The method of claim 13 which further comprises the step of resending the classified requests that have stayed in the problem pool longer than a prespecified time.

* * * * *

UNITED STATES PATENT AND TRADEMARK OFFICE
CERTIFICATE OF CORRECTION

PATENT NO. : 6,510,431 B1
DATED : January 21, 2003
INVENTOR(S) : Matthias Eichstaedt et al.

It is certified that error appears in the above-identified patent and that said Letters Patent is hereby corrected as shown below:

Column 7,
Line 24, delete "not g" and replace with -- notifying --.

Column 8,
Line 15, delete "filer" and replace with -- further --.

Signed and Sealed this

Twenty-second Day of July, 2003

JAMES E. ROGAN
*Director of the United States Patent and Trademark Office*